Oct. 24, 1933.   F. COREY ET AL   1,932,065
DIRECTION INDICATING BEACON
Filed Jan. 18, 1929   3 Sheets-Sheet 3
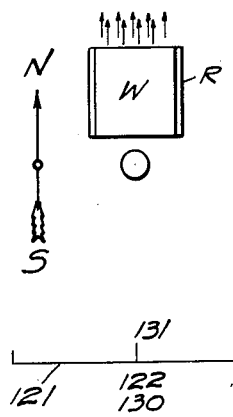
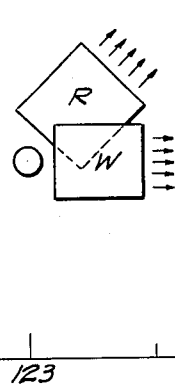
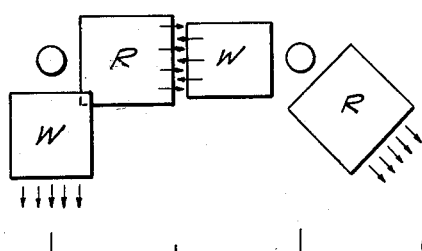
Fig. 3.  Fig. 4.  Fig. 5.  Fig. 6.
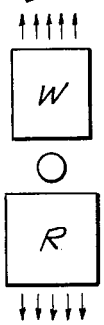
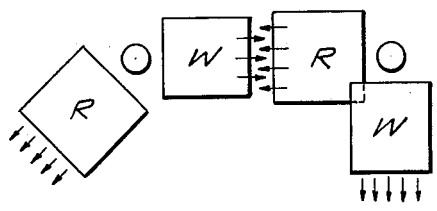
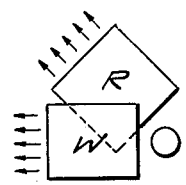
Fig. 7.  Fig. 8.  Fig. 9.  Fig. 10.
Fig. 11.
INVENTORS
*Flournoy Corey &*
*Henry A. Thompson.*
BY
/ATTORNEY Patented Oct. 24, 1933

1,932,065

UNITED STATES PATENT OFFICE 1,932,065

DIRECTION-INDICATING BEACON

Flournoy Corey and Henry H. Thompson, Wilkinsburg, Pa., assignors to Westinghouse Electric and Manufacturing Company, a corporation of Pennsylvania Application January 18, 1929. Serial No. 333,289

10 Claims. (Cl. 177—352)

Our invention refers to illuminating devices and has particular relation to signalling beacons suitable for indicating the points of the compass, an airway, an obstacle and the like or for advertising purposes.

The art of aviation has progressed to such an extent that it is very desirable to indicate the location of certain landmarks and obstacles by means of beacons. At times, it is desirable that the aviator should be able to determine his position or course with relation to a given beacon or to have a means for checking his orientating devices.

Therefore, an object of the invention is to provide a beacon to show the location of an air field, an obstacle, an airway and the like.

Another object of the invention is to indicate to an observer a predetermined direction from the beacon and also the points of the compass with regard to the predetermined direction.

In practicing the invention two projectors are provided which are so mounted and driven that they are rotated about vertical axes in the same direction. One projector is rotated at a greater angular velocity than the other and the projected beams are thus caused to overlap each other in a predetermined direction. The relation of the projected beams, as they pass other given points, give indicia of the relation of the given point to the predetermined direction.

Referring to the drawings, in which like figures indicate like parts:

Figure 1:
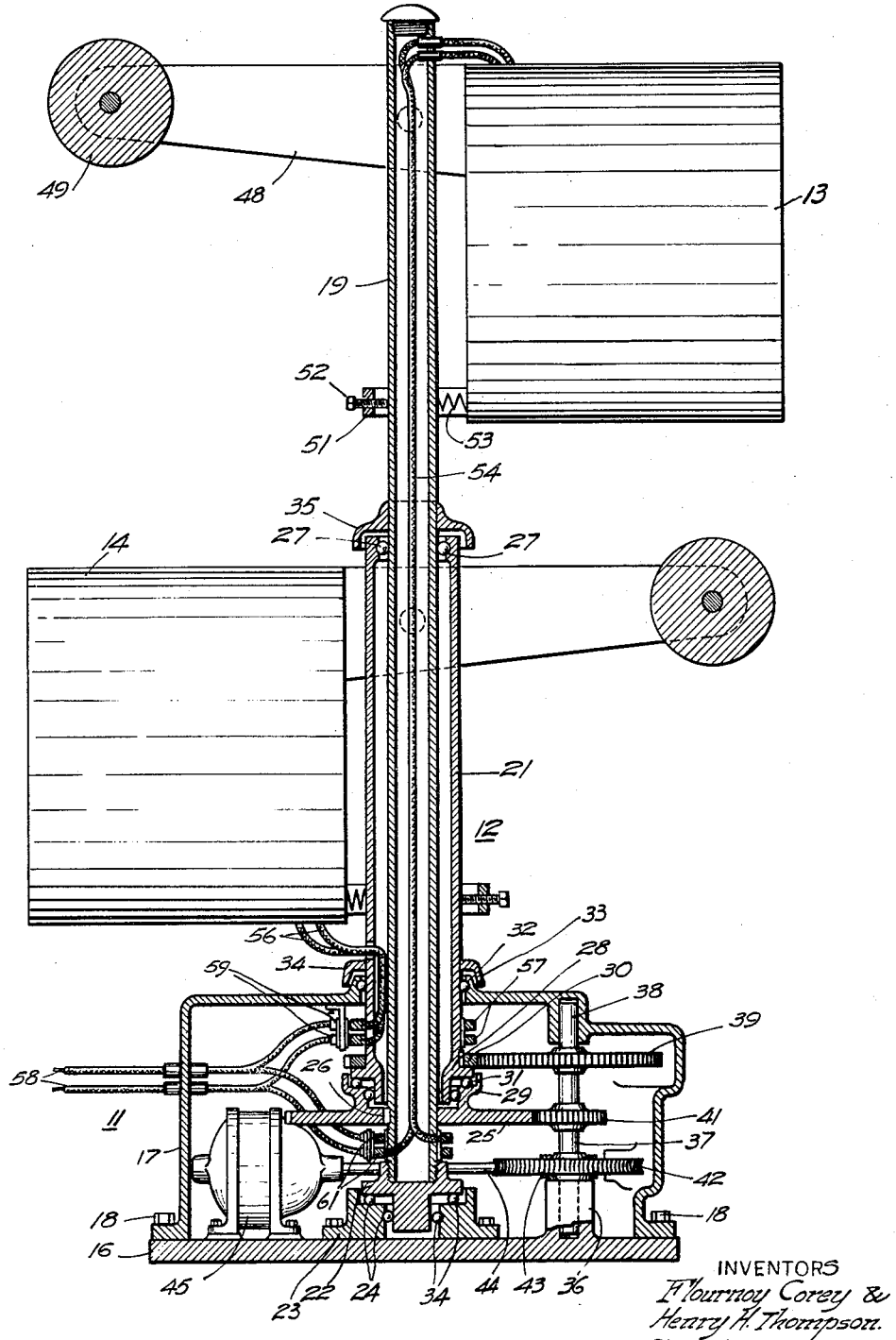
Figure 1 is a view, partly in section and partly in elevation, of one embodiment of the invention.

Figs. 3 to 10, inclusive, are diagrammatic top plan views of the device shown in Fig. 1 at different points in the cycle of operation of the device, and Fig. 11 is a chart of the time intervals of flashes of light from the beacon when viewed from different points of the compass.

Referring more particularly to Fig. 1, the device comprises a base portion 11 having upwardly extending portions 12 upon which are mounted two projectors 13 and 14. The base portion comprises a base plate 16 upon which a cover 17 is mounted by suitable securing means, such as bolts 18.

The vertically-extending portion 12 comprises an inner tubular member 19 and a shorter outer tubular member 21 the lower ends of which extend into the cover.

The inner tubular member is supported, at its lower end, by an annular member 22 which cooperates with an annular bearing 23, to constitute a part of base plate 16, for supporting the tubular member in a substantially vertical position and for permitting rotation of the tube 19 and projector 13 mounted thereon.

The inner tubular member 19 and the flanged member 22 may be secured in fixed relation to each other by screw threads or any other suitable means effective for the intended purpose.

A plurality of balls 24 are provided between flange 22 and base 11 so that the combination of the base annular bearing 23 and flange member 22 constitute a step bearing.

A driving gear wheel 25 is mounted on the tubular member 19 adjacent to the lower end by any suitable means, such as a key 26.

The outer tubular member 21 has a ball bearing 27 associated therewith at its upper end, and its lower end is provided with a flanged portion 28 to cooperate with a flanged portion 29 on the gear wheel 25 and a plurality of balls 31 to constitute a step bearing. A pinion gear 30 is secured to the tubular member 21 just above the flange 29.

Another ball bearing 32 is provided outside the outer tube to cooperate with a flange 33 of the cover 17 to constitute a bearing assembly adapted to assist in holding the tubular members 19 and 21 in an upright position. A downwardly extending flange 34 is located on the outside of the short tubular member to provide a cover for protecting the bearing 32 and another downwardly extending flange 35 is provided intermediate the ends of the longer tubular member to protect the upper bearing.

As the device is to be installed in the open, the covers 17, 34 and 35 are effective to shed rain and protect the bearings and other moving parts of the device from moisture and dust.

A vertically disposed lug 36, which is a part of the base, is provided, at one side of the annular bearing 23, to constitute a step bearing for a vertically disposed counter shaft 37. The upper end of the shaft is journalled in a suitable lug 38 on the inside of the cover constituting a bearing therefor.

A gear wheel 39 is provided at the upper end of the countershaft and is rigidly secured thereto by means of a key or the like. This gear wheel is adapted to engage the pinion 30 on tubular member 21. A pinion 41 is mounted on the countershaft intermediate its ends to engage the gear wheel 25 on tubular member 19.

A worm wheel 42 is secured rigidly to the lower end of the countershaft, and a worm 43, mounted on the shaft 44 of a motor 45, is adapted to engage the worm wheel and to rotate the countershaft and the respective gear trains, thus rotating the tubular members on energization of the motor.

This gear train thus provides a means for causing rotative movement of the two coaxial tubular members 19 and 21, and, therefore, the projectors 13 and 14. It may readily be understood that the ratios of the respective gears may be such as to cause any desired angular velocity of the one tubular member with respect to the angular velocity of the other.

The projector 13 is pivotally mounted on the upper end of the inner tubular member 19 by means of an arm 48 pivotally attached to the tubular member, and the projector housing 13 is mounted on one end of the arm, a counterweight 49 being mounted on the other end. Any suitable projector may be utilized which is effective to emit a continuous beam of radiant energy. The projector is made adjustable vertically through a few degrees by means of adjustable clamping means comprising a stirrup 51, adjusting screw 52 and spring 53.

The lower projector 14 is a substantial duplicate of the upper projector except that it is mounted pivotally at the upper end of the outer tubular member 21 and rotates with it.

A plurality of leads or connectors 54 extend through the inner tubular member to the light source in the upper projector 13, and their lower ends are connected to suitably insulated slip rings 55 which are located immediately below the gear wheel 25 on the tube 19.

Conductors 56 are connected to the light source in projector 14 and extend into and through the tube 19 to suitably insulated slip rings 57 which are mounted on the lower end of the tube 21. Branch-line conductors 58 are electrically connected to brushes 59 which engage slip rings 57 and are also connected to brushes 61 which engage slip rings 55. An electrical connection is made also between the branch line and the motor so that energization of the branch-line circuit energizes the light source in projectors 13 and 14 and also energizes the motor 45 to cause rotation of the projectors.

Figure 2:
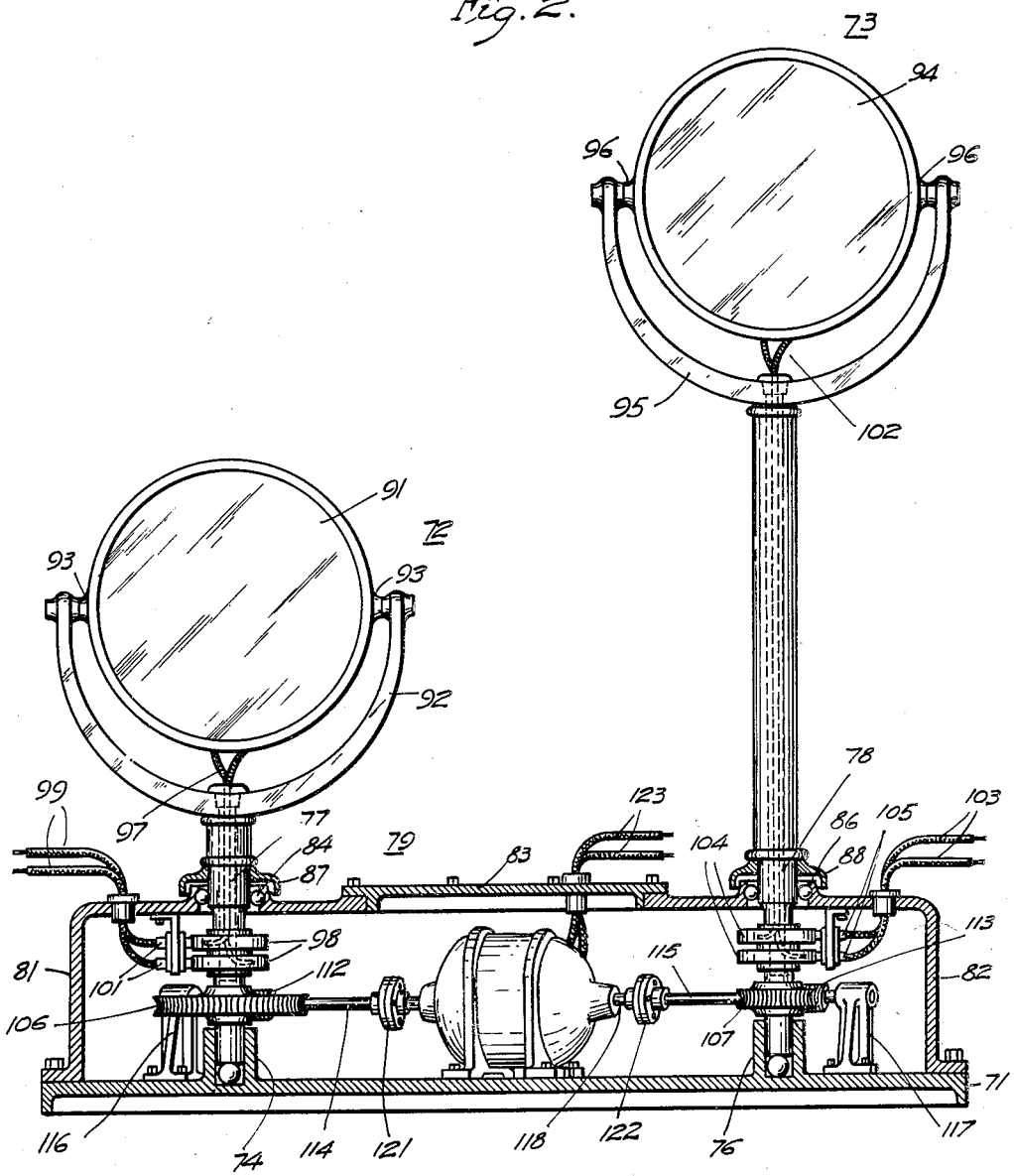
Fig. 2 is a view, partly in elevation and partly in section, of another embodiment of the invention.

Another embodiment of the invention is shown in Fig. 2. The beacon there shown comprises a base plate 71 upon which are located two independently mounted projector units 72 and 73. The base plate 71 is provided with two vertically extending lugs 74 and 76 which provide a step bearing for journalling a short shaft 77 and a long shaft 78. The cover member 79 comprises two covers 81 and 82 connected by a plate 83. The covers 81 and 82 are severally provided with upwardly extending flanges 84 and 86 which are adapted to provide a bearing surface for journalling intermediate portions of the shafts 77 and 78. Downwardly extending flanges 87 and 88 on shafts 77 and 78 respectively constitute covers for protecting the bearings from the elements.

A projector 91 is mounted on the shaft 77 by means of a yoke 92 which engages suitable pivots 93 at the sides of the projector.

In the same manner, projector 94 is mounted on the upper end of the long shaft 78 by means of a yoke 95 which engages pivots 96.

Electrical conductors 97 are connected to the light source in projector 91 and extend down, through a suitable opening in the shaft 77, to the insulated slip rings 98 which are adapted to be connected to the supply circuit 99 by means of brushes 101.

In the same manner, conductors 102 make electrical connection to the light source in projector 94 and are electrically connected to the main-line circuit 103 by means of slip rings 104 and brushes 105.

A large worm gear 106 is mounted on the short shaft 77 and is secured thereto by any suitable means, as, for instance, by a key connection. In the same manner, a small worm wheel 107 is mounted on the lower end of the long shaft 78.

A motor 111 is mounted on the base plate 71 to drive the worm wheels 106 and 107 by means of worms 112 and 113 which are mounted on shaft extensions 114 and 115. The shaft extensions are journalled in suitable brackets 116 and 117 and are connected to the shaft 118 of motor 111 by means of couplings 121 and 122. The motor 111 is connected to the supply circuit by means of conductors 123.

The gear ratio of worm wheel 106 and worm 112 and that of worm wheel 107 and worm 113 may be so chosen that any desired ratio of angular velocity of one projector with respect to the other may be secured.

As has been hereinbefore stated and as will be noted from the drawings, the projectors shown are adapted to be rotated in the same direction and, for purposes of illustration, a speed ratio or angular velocity of 2 to 1 has been chosen. In Figs. 3 to 10, inclusive, are shown, diagrammatically, the consecutive positions of the beacon shown in Fig. 1 when the projectors are rotated in a clockwise direction.

In order to distinguish the beacons, the one from the other, a red lens may be used in the slower-moving beacon and a clear-glass lens in the more rapidly-moving beacon. This arrangement is not necessary and, if desired, both lenses may be of clear glass, as is hereinafter explained, and the beacon will indicate the degrees of the compass in the same manner.

Referring to Figs. 3 to 10, inclusive, for the purpose of illustration only, the slower-moving projector, designated by the letter R, is considered to be equipped with a red-colored lens, and the faster-moving projector, designated by the letter W, is considered to be equipped with a clear-glass lens. The line 121 below the figures represents the time elapsed between consecutive positions of the beacon at certain time intervals, and, for the purpose of illustration, each interval has been taken as two seconds. An observer, at some distance from the beacon, is not likely to see the projected beams from the beacon but sees only flashes of light, as the beams are projected directly into his eyes. For purposes of illustration, the flash of light from the projector equipped with the red lens is termed the "red" flash, and the flash from the projector equipped with the clear-glass lens is termed the "white" flash of light.

Referring to Fig. 3, the two projectors are represented as being located the one directly above the other, consequently, their beams coincide. Since the ratio of the speeds of the two projectors is 2 to 1, during the period of time represented on the line 121 by the space from 122 to 123, the W projector will rotate 90° and the R projector 45° (Fig. 4).

During the next period of time, as represented by the space 123 to 124, the W projector will have rotated 180°, and the R projector 90° to the position shown in Fig. 5.

During the succeeding period of time, as represented by space 124 to 125, the W projector will rotate 270° while the R projector is rotating 135°. This relative angular progression of the two projectors will result in the beam from the W projector coinciding with that from the R projector by the time the latter has made one complete revolution.

By reference to Fig. 3, it may be seen that a person directly north of the beacon will receive a double flash of light when the projectors are in the position shown. At a time which is eight units of time later, as represented by the space from 122 to 126, the observer will receive a white flash, and eight seconds later, as represented by the space from 126 to 130, he will receive another flash of light which is the light produced by the combined beams of the R and W projectors.

If an observer is positioned at a point directly east of the beacon, he will receive a white flash when the projectors reach the position shown in Fig. 4, and two seconds later, as shown in Fig. 5, will receive a red flash. Six seconds later, as shown in Fig. 8, he will receive a white flash, and eight seconds later, as shown again in Fig. 4, he will receive a white flash.

An observer directly south of the beacon will receive a white flash of light when the projectors reach the position shown in Fig. 5. Four seconds later, as represented in Fig. 7, he will receive a red flash of light, and four seconds afterward, as shown in Fig. 9, he will receive a white flash of light. Eight seconds later, as represented by Fig. 5, he will receive another white flash.

A person directly west of the beacon will receive a white flash when the projector has reached the position shown in Fig. 6, and a red flash six seconds later, as shown in Fig. 9. Two seconds later, as shown in Fig. 10, he will receive a white flash, and eight seconds afterward, will receive a white flash.

If intermediate points on the compass, such as northeast, southeast, southwest and northwest are worked out, it will be found that the time orders therefor may be set down in a table, as shown in Fig. 11.

In the table shown in Fig. 11, the starting point has been taken as the point at which both projectors point directly north (Fig. 3). With this position as a starting point and arbitrarily taking the time at which this occurs as zero time, the time intervals for two complete revolutions of the slower projector have been plotted across the table, and the sequence of the different colored flashes, when viewed from the eight cardinal points of the compass, have been indicated by RW (red and white combined) R or W, as the case may be, and have been plotted across the table.

For instance, viewing the beacon from a point to the south, the observer first sees a white flash (W at 4), four seconds later a red flash (R at 8), four seconds later a white flash (W at 12), and eight seconds later a white flash (W at 20) and repeat.

It will be noted that, regardless of the position of the observer, the interval between successive white flashes will be eight seconds. If this eight-seconds interval is taken as a reference, it will be noted that the interval of time elapsing after the white flash following the eight-seconds interval will indicate the position of the observer. If the observer is east of the beacon, the interval will be two seconds, south of it four seconds, west of it six seconds and if he is north of the beacon, he will see flashes of light at eight-seconds intervals.

It is apparent that it is unnecessary that one of the beams be colored and, as has been explained, the observer may ascertain his position by observing and timing the interval after the eight-seconds interval, and does not need a colored flash to indicate which is the interval to be timed in order to ascertain his position.

The time period immediately following the second white flash may be utilized in determining the location with reference to points on the compass taken progressively in a clockwise direction, while the time interval after the red flash might be taken as an indication of the points of the compass in a counterclockwise direction.

By reference to the table, it may be readily understood that it is not entirely necessary that different colored lenses be used for the one or the other or both of the projectors, since the reference time interval of eight seconds remains the same, and the time interval immediately following the reference time interval will indicate the position of the observer with respect to points of the compass.

It is apparent that, if an angular-velocity ratio of 3 to 1 is utilized, the projected beams will intersect or overlap one another twice in each revolution of the slower beam, and that the cycle of time orders hereinbefore explained will take place within 180° instead of 360°. If a ratio of 5 to 1 were used, the beams would intersect one another four times at each revolution of the slower projector, and the time order sequence would take place within 90°. If a speed radio of 9 to 1 were used, the beams would intersect eight times in each revolution of the slower projector and the time-order sequence would take place within 45°. It is apparent that the circle may be divided in this way to as great an extent as is considered necessary, and the projected beams will intersect one another at certain definite points.

If other speed ratios are utilized, the beams will intersect in progressive or retrograde points about the compass in accordance with the speed ratios. Such a beacon might be very desirable as an advertising device.

Although certain specific modifications of the invention have been illustrated and described, it is apparent that other modifications may be made by those skilled in the art. Such modifications may be made without departing from the spirit and scope of the invention, as set forth in the appended claims.

We claim as our invention:

1. A beacon comprising a plurality of adjacent rotatably mounted projectors adapted to project wave impulses in substantially parallel planes, coupling means for causing one projector to rotate in the same direction at a greater speed than the other, and driving means for effecting rotation of the projectors.

2. A beacon comprising a plurality of adjacent rotatably mounted projectors adapted to project wave impulses in substantially parallel planes and means for causing the projectors to rotate in the same direction each at a given constant speed different from the other speed.

3. A beacon device comprising two adjacently mounted continuously rotating heads, adapted to project wave impulses in substantially parallel planes, each having means thereon for continuously projecting a beam, and coupled driving means for rotating the heads, one at a greater angular velocity than the other, the coupled driving means being so automatically interdisposed that the said heads point in the same direction at a predetermined point.

4. A signalling device comprising a plurality of adjacent sources of wave emissions, said sources adapted to project wave impulses in substantially parallel planes, driving means for automatically revolving the wave sources simultaneously in planes substantially parallel to their axis of projection and each at a different speed to indicate direction by means of the intervals between wave emissions received at a compass point within range of said emissions.

5. In a direction-indicating beacon, means for continuously projecting a plurality of adjacent and substantially parallel waves comprising two rotatably mounted projectors, means for rotating the projectors in planes substantially parallel to the axis of projection, coupling means for automatically causing one projector to rotate at a greater speed than the other so that the direction of projection of the projectors coincide at least once in every revolution of the slow-traveling projector to indicate a predetermined direction.

6. In a direction-indicating beacon, means for continuously projecting a plurality of adjacent and substantially parallel waves comprising two rotatably mounted wave projectors, means for rotating the projectors in planes substantially parallel to their axis of projection, coupling means for causing one projector to rotate at a greater speed than the other, whereby the direction of projection of the projectors is caused to coincide once in every revolution of the slow-traveling projector to indicate a predetermined direction, other directions being indicated by waves of the two projectors spaced at different time intervals.

7. A signalling device comprising a plurality of adjacently-disposed sources of projected wave emissions, means for rotatably supporting the sources of projected wave emissions at different levels whereby said sources project wave impulses in substantially parallel planes and in a direction other than vertical, and driving means for automatically revolving the wave sources simultaneously and each at a different speed to indicate direction by means of the time interval between the wave emissions received at a compass point within range of the wave emissions.

8. In a signalling beacon, in combination, a plurality of adjacently disposed light projectors, means for continuously and simultaneously rotating the projectors each at a different predetermined speed, said projectors being disposed to project substantially parallel beams in a direction other than vertical whereby the time interval between the projected beams serves to indicate direction to an observer located at any compass point within the range of the projected beams.

9. A signalling device comprising a plurality of light projectors, means for rotatably supporting the projectors one above the other in the same vertical axis of rotation, said projectors being disposed to project substantially parallel beams substantially at right angles to the axis of rotation, and means operable to effect continuous and simultaneous rotation of the projectors each at different predetermined speeds.

10. A signalling device comprising a plurality of rotatably mounted and adjacently disposed light projectors, said projectors being supported at different levels to project substantially parallel beams in a direction other than vertical, a motor, and transmission means interposed between the motor and the projectors adapted to effect continuous and simultaneous rotation of the projectors each at different predetermined speeds, whereby the projectors are caused to project substantially parallel beams having different predetermined angular relation during a predetermined time interval.

FLOURNOY COREY.
HENRY H. THOMPSON.